Feb. 17, 1925.
W. HURLBURT
PACKING RING COMPRESSOR SLEEVE
Filed June 23, 1921
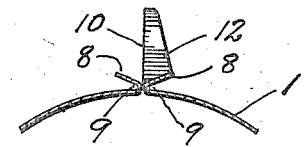
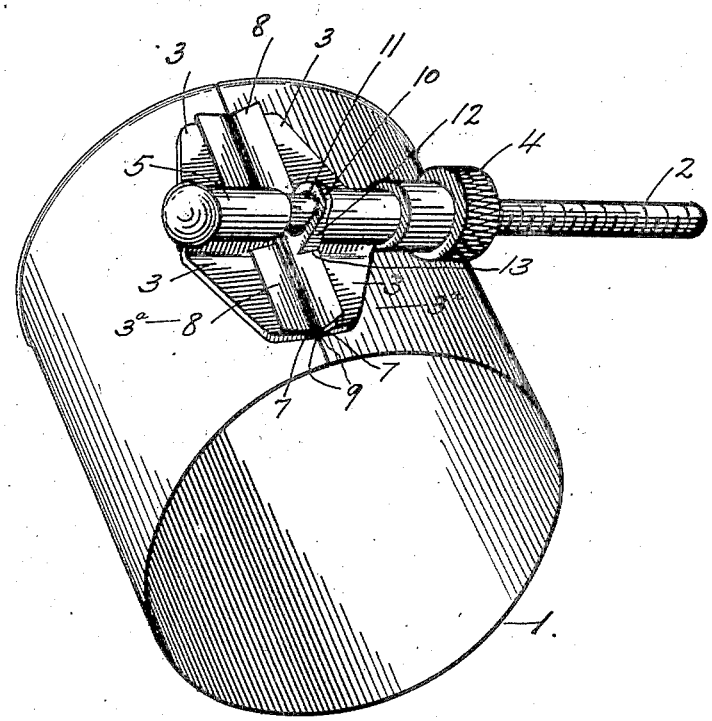
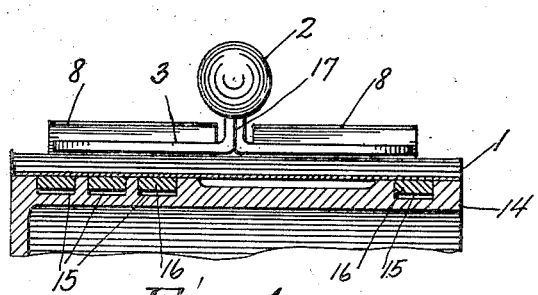
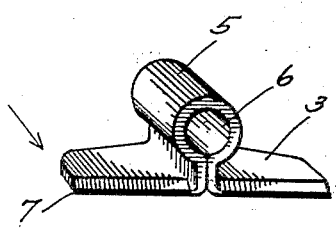
Inventor
Watson Hurlburt Patented Feb. 17, 1925. 1,526,601

UNITED STATES PATENT OFFICE.

WATSON HURLBURT, OF CHICAGO, ILLINOIS.

PACKING-RING COMPRESSOR SLEEVE.

Application filed June 23, 1921. Serial No. 479,881.

*To all whom it may concern:*

Be it known that I, WATSON HURLBURT, a citizen of the United States, residing at Chicago, in the State of Illinois and county of Cook, have invented a new and useful Improvement in Packing-Ring Compressor Sleeves, of which the following is a specification.

My invention relates to a metal sleeve and its attachments, used to compress the rings on the piston of a gas or gasoline engine, where the rings have sprung open after being released from the cylinder walls by removal for repairs or otherwise, and it is desired to return the piston to the cylinder.

The principal objects of my invention are:—First, to provide a handy attachment to reduce the diameter of a piston ring to enable a person to insert a piston with its ring, into the cylinder. Second, to reduce the manufacturing costs without sacrificing its efficiency. Third, the means used for pulling the ends of the sleeve together being applicable to all sized sleeves used for different diameters of pistons. Fourth, the construction being such that all the parts stay together when not in use.

Various devices have been used for compressing the rings with more or less success, some being limited in their use on pistons inserted from the top only, while others can be used both top and bottom, but the usual construction is costly, involving an over amount of manual labor, this being necessitated by the manner of construction and the principles involved.

I have evolved a construction eliminating much hand-work, substituting therefor the punch press and the use of forming dies. Generally speaking it consists of an open sheet metal sleeve, of a width sufficient to cover a predetermined number of rings and of a length that will completely encircle the piston, when the packing rings are in their working position. The ends of this sleeve are formed into hooks by which I am enabled to draw the parts together by the impingement of my buttresses in the throat of the hooks, the drawing together of which may be accomplished by means of a threaded screw and thumb nut, or other desirable device. My buttresses are punched from a sheet metal blank and formed by dies. The body of one of the long sides being beveled at a less angle than that of the hooks, and formed into a thin, narrow rounded edge which may have a hinge action, accommodating itself to the varying positions of the hooks. By this formation all the compressive force is exerted on the long and narrow area, and may be no wider than the diameter of the body of a pin; thus I can apply the pulling force close to the surface of the compressor sleeve and reduce to a minimum the leverage tending to straighten out the hook formed at the end of the sheet metal ring, otherwise called the compressor sleeve. By thus shortening the leverage at the point of application of the force, a hook may be formed with a slightly rounded throat and bent straight back to form an acute angle with the body of the ring, requiring no additional reenforcement, and enabling me to use a comparatively thin piece of metal in one continuous piece without further support by riveting or welding. By making the middle portion of one of the hooks longer and outstanding from the body of the ring, at practically 90° and forming an elongated hole therein, I at once form an ear, the purpose of which is to retain the screw with its buttresses and nuts from being lost, when this means is used for drawing the ends together, the ear taking no part in the straining action from the compressure, and to give it more stability, I form a flange around the outer edge standing normally to the plane of the ear. A narrow space at the center of the other hook may be cut away to allow the outstanding portion of its buttress to pass therethrough. One edge of the sleeve is given a slight outward flare to prevent the thin metal from entering the cylinder between that and the piston.

In using this sleeve I proceed as follows: having inserted all the rings in their respective slots in the piston preparatory to inserting it in the cylinder, the sleeve is slipped on over all the rings, the outwardly curved edge of said sleeve even with the top of the piston, one buttress is slipped on the threaded screw and the screw inserted in the oblong hole of the upstanding ear, then the second buttress is slipped on, the narrow edge of these two facing each other. Next the thumb nut is started on the screw, and while one hand grasps the sleeve encircling the piston, the buttresses are guided into the corresponding hooks on the sleeve and the knurled nut worked into contact with the buttress next it, and continuing the screwing on of the nut the buttresses force the ends of the sleeve together, thus reducing the diameter of the rings until they will pass into the cylinder by pushing the piston through the sleeve, the flaring end of which acts as a stop to prevent its ingress between the cylinder wall and the body of the piston.

I do not wish to be limited to the exact details of construction herewith shown, as various deviations from that illustrated would not depart from the spirit of my invention.

The preferred construction as outlined in my invention, is illustrated in the accompanying drawings in which:—

Fig. 1 illustrates a compressor sleeve with its attachments for forcing the ends together, through the medium of the buttresses and screw. Fig. 2 illustrates one of the buttresses. Fig. 3 is a section in line 3ª—3ª of Fig. 1, buttress and screw removed. Fig. 4 is a longitudinal section through a piston with its various rings, my compressor sleeve being in position, and the rings reduced in diameter to the necessary degree.

Similar numerals refer to similar parts in the various views.

The sleeve 1, the threaded screw 2, the two buttresses 3, and the knurled thumb nut 4, constitute the total outfit, the two buttresses 3, with upstanding portion 5, containing the channel 6, to accommodate the screw 2, form the connection between the said screw and the ends of the sleeve. The reduced thickness of the buttress at the edge, easily enter the hooks and lie against the throat 9, and being of a less angle than said hooks, a hinge action is obtainable, conforming to varying angles produced at different distances apart of the hooks 8. The upstanding ear 10, in the sleeve 1, and occupying a middle position between the hooks 8, has an elongated hole 11, through which the screw 2, works and serves the sole purpose of retaining said screw and other parts when not in use. To strengthen this ear the edges are flanged as at 12 and form a continuous line with the hooks 8, as at 13. The part 5, of the buttress 3, occupies the recess thus formed by the flange 12, of the ear 10. The body of the piston 14, with the rings 15, are compressed into their various slots 16, by the force of the sleeve 1, as shown in Fig. 4. The force exerted by screwing on the nut 4, acts on the buttresses 3. in the direction of the arrow in Fig. 2, which is in line of the greatest resistance, and I am enabled to use a comparatively thin piece of metal in forming the buttresses, and by making close contact as at 17, the two leaves of the buttress tend to reinforce each other.

I claim:—

1. In a packing ring compressor sleeve the combination of an open thin metal sleeve, hooks formed on the parallel edges thereof, and opening away from each other, adjustable, detachable buttresses a portion of which may be interlocked with the before-mentioned hooks and an adjustable member designed to interact with the buttresses in forcing the ends of the sleeve towards each other to reduce the internal diameter.

2. In a packing ring compressor sleeve the combination of an open thin metal sleeve the ends of which are designed to be drawn together to reduce the internal diameter, hooks formed from the main body of said sleeve the plane of said hooks being normal to the plane of said sleeve and bent at an acute angle from the main body, buttresses of a length conforming to that of the hooks and intended to engage said hooks and means for retaining the buttresses and forcing them toward each other while engaging the hooks of the compressor sleeve, all and for the purposes for which it is designed.

3. In a packing ring compressor sleeve the combination of an open thin metal sleeve the ends of which are designed to be drawn together to reduce the internal diameter, hooks formed from the main body of the sleeve designed to retain a member capable of forcing the two towards each other, a portion of one hook being longer than the remaining portion forming an ear outstanding and normal to the body of the sleeve and having a hole therein for retaining purposes.

4. In a packing ring compressor sleeve the combination of an open thin metal sleeve, hooks formed on the parallel edges of said sleeve opening away from each other, buttresses, one edge of each being beveled at a less angle than the hooks and designed to engage the before mentioned hooks, the major portion of said buttresses upstanding from its engaging edge, and a channel formed therein to accommodate another member and conforming to the shape of such member whereby said member interacts with said buttresses, interlocked with said hooks, to draw the ends of the sleeve together to reduce the internal diameter as and for the purposes specified.

WATSON HURLBURT.